United States Patent [19]

Jameson

[11] 4,062,431

[45] Dec. 13, 1977

[54] POWER TRANSMISSION WITH MODULATING TORQUE CONVERTER INPUT CLUTCH

[75] Inventor: James J. Jameson, Coffeyville, Kans.

[73] Assignee: Gardner-Denver Company, Dallas, Tex.

[21] Appl. No.: 699,406

[22] Filed: June 24, 1976

[51] Int. Cl.² .............................................. F16D 47/06
[52] U.S. Cl. ..................................... 192/3.33; 192/86
[58] Field of Search ............................... 192/3.33, 3.3

[56] References Cited

U.S. PATENT DOCUMENTS

| 3,326,066 | 6/1967 | Murphy | 192/3.33 |
| 3,384,209 | 5/1968 | Murphy | 192/3.33 |

FOREIGN PATENT DOCUMENTS 968,075  8/1964  United Kingdom ................ 192/3.33

Primary Examiner—Benjamin W. Wyche
Attorney, Agent, or Firm—Michael E. Martin

[57] ABSTRACT

A power transmission mechanism includes a hydrokinetic torque converter driven by a hydraulically actuated modulating friction clutch having a piston disposed in and sealingly engaged with the converter housing to form opposed fluid chambers. Fluid in the torque converter housing flows through an orifice between the chambers and exits the converter housing by way of a flow control valve. A pressure differential is imposed on the piston by controlling the outflow of fluid from one of the chambers to modulate clutch engagement for varying the power output of the torque converter.

3 Claims, 3 Drawing Figures

4,062,431

POWER TRANSMISSION WITH MODULATING TORQUE CONVERTER INPUT CLUTCH

BACKGROUND OF THE INVENTION

This invention pertains to power transmission mechanisms which are generally characterized by a hydrokinetic device driven by a friction clutch which is capable of being continuously slipped to vary the input power and speed to the impeller of the device which may be a fluid coupling or torque converter. Such transmission mechanisms usually include a piston which is subjected to a controlled fluid pressure for varying the slippage of the clutch to split the power output of the transmission between a power takeoff mechanism and an output shaft driven by the torque converter.

Various arrangements of the friction clutch elements including the actuating piston as well as hydraulic control circuits for controlling clutch engagement are known in the art of power transmissions. It is believed that known arrangements are generally somewhat complicated mechanically and with respect to the fluid control circuitry. The application of power transmission devices of the general type to which the present invention pertains often require plural power output paths which are subject to widely varying power demands. Such applications include vehicles which require apportionment of the engine power between the vehicle drive wheels and auxiliary equipment. The inherent complexity of power transmissions used in these types of vehicles makes desirable improvements which simplify the mechanical structure and fluid control circuitry of the transmission.

SUMMARY OF THE INVENTION

The present invention provides for a power transmission mechanism characterized by a hydrokinetic drive element which is provided with an improved hydraulically actuated modulating input clutch and control circuit therefor.

In accordance with the present invention a hydraulically actuated clutch is disposed within a rotatable housing of a hydrokinetic torque converter and is responsive to controlled variation of the pressure of fluid flowing through the housing to modulate the engagement of the clutch.

In accordance with the clutch arrangement of the present invention a hydraulically actuated piston may be controlled to vary the engagement of a friction for driving a torque converter impeller by regulating the output flow of fluid from the converter housing. Fluid flow through the converter is controlled in relation to the engagement of the clutch and the power throughput of the torque converter itself. Therefore, increased fluid flow through the torque converter is automatically obtained as needed for cooling the torque converter and the input clutch. The clutch arrangement of the present invention also provides a flow path for fluid flowing through the converter which assures an adequate circulation of fluid through the clutch for cooling purposes.

The present invention further provides a transmission mechanism including a hydrokinetic torque converter having a modulating input clutch and control system therefor which is simplified in construction, requires less space, and can be lower in manufacturing cost than heretofore known devices.

DESCRIPTION OF THE PREFERRED EMBODIMENT

Figure 1:
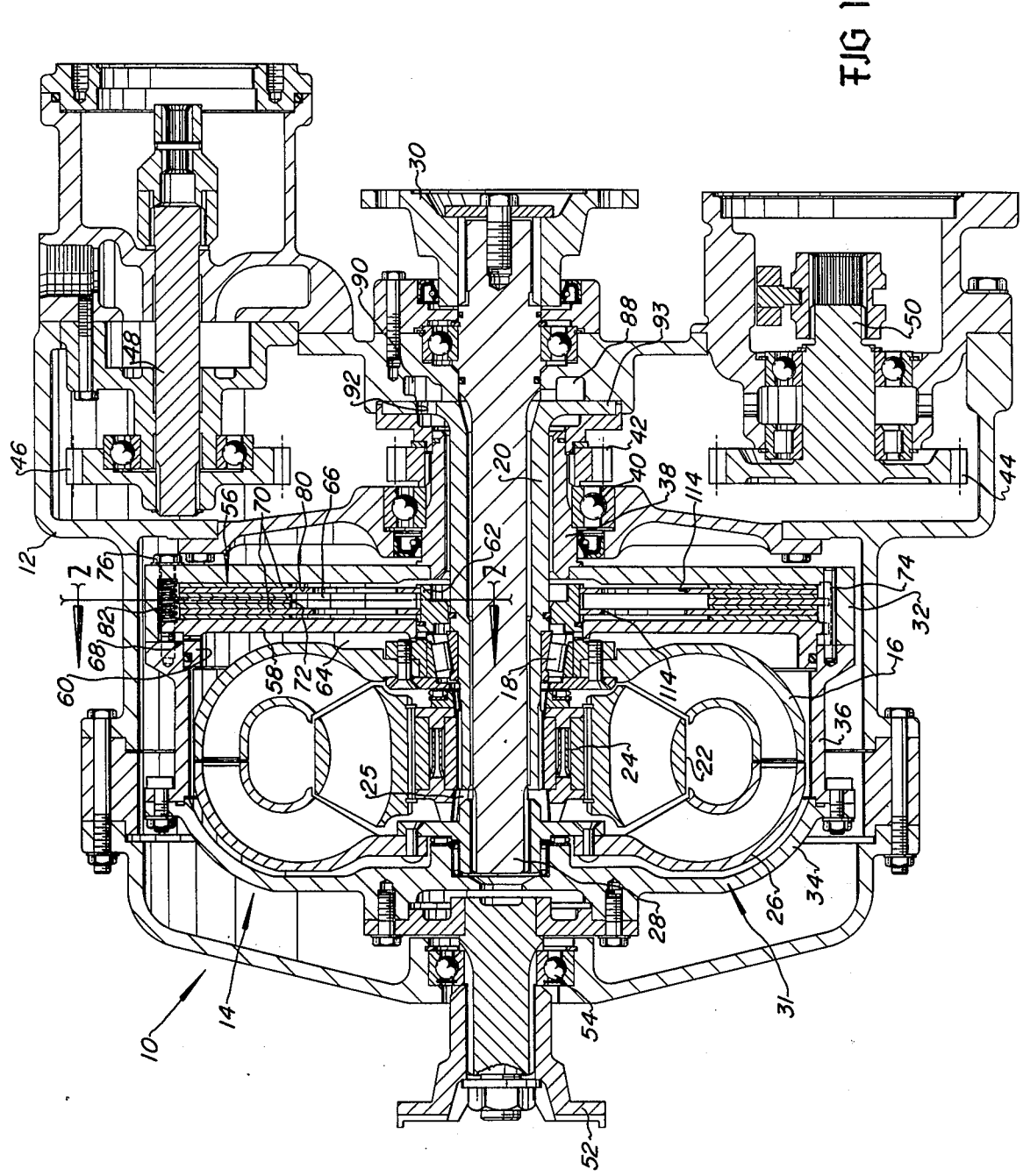
FIG. 1 is a longitudinal section view of a transmission mechanism in accordance with the present invention.

Referring to FIG. 1 of the drawings a mechanical power transmission mechanism is shown in longitudinal center section and generally designated by the numeral 10. The transmission 10 includes a casing 12 in which is disposed a hydrokinetic coupling in the form of a torque converter generally designated by the numeral 14. The torque converter 14 is characterized by an impeller 16 which is rotatably mounted on a suitable bearing assembly 18. The bearing assembly 18 is mounted on a stationary tubular member 20 secured to the casing 12. The torque converter 10 also includes a stator member 22 mounted on a one-way clutch 24 disposed on the member 20, and a turbine member 26 which is mounted on and drivably connected to a rotatable output shaft 28. The shaft 28 is disposed in concentric spaced relationship within the tubular member 20 and is adapted to be connected to a coupling member 30. The shaft 28 may also be drivingly connected to further transmission gearing and clutches in a well known way. The impeller 16, turbine 26, and stator 22 include respective bladed portions which form a toroidal flow chamber wherein fluid is circulated in response to rotation of the impeller to rotatably drive the turbine in a well known way.

The impeller 16, stator 22 and turbine 26 are disposed within a rotatable housing 31 comprising spaced apart end covers 32 and 34 which are removably fastened to a cylindrical intermediate member 36. The end cover 32 includes a hub portion 38 which is rotatably mounted on a bearing 40 secured in the casing. The hub portion 38 is disposed in concentric spaced relationship around the tubular member 20 and is drivingly connected to a gear 42 by suitable interfitting splines. The gear 42 is meshed with idler gears, not shown, which in turn are meshed with gears 44 and 46. Gears 44 and 46 are drivingly connected to power takeoff shafts 48 and 50. The shafts 48 and 50 may be connected to hydraulic pumps or other power takeoff devices. The end cover 34 is drivingly connected to rotatable input shaft means 52 mounted in a suitable bearing assembly 54.

The transmission 10 also includes a modulating friction disk clutch 56 disposed within the torque converter housing 31 for releasably connecting the impeller 16 to the housing for driving rotation by the housing. The clutch 56 includes a piston 58 which is axially movable with respect to the housing 31 and includes a flange 60 near the outer periphery of the piston which is in fluid sealing engagement with the housing member 36 by way of a suitable seal ring. The inner periphery of the piston 58 is in close fitting and substantially fluid sealing relationship to a hub poriton 62 of the impeller 16. The hub 62 is also in fluid sealing relationship with respect to the tubular member 20. Suitable piston ring or O-ring seals may be disposed between the piston 58 and the hub 62 and between the hub and the tubular member 20. Accordingly, the piston 58 divides the interior of the housing 31 into a first chamber 64 and a second chamber 66, which chambers are in communication with each other by way of a passage 68 formed in the flange 60 of the piston.

Figure 2:
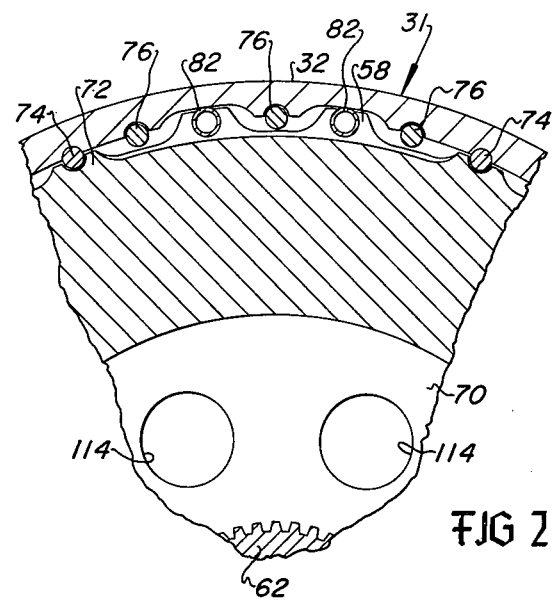
FIG. 2 is a fragmentary section view taken along the line 2—2 of FIG. 1.

Referring to FIGS. 1 and 2 the clutch 56 also includes a pair of driven plates 70 which are formed to have suitable friction material bonded thereon. The plates 70 are each connected to the hub 62 of the impeller by suitable interfitting splines. The plates 70 are separated by an annular driving disk member 72 which is secured for rotation with the housing 31 by a plurality of pins 74. In a similar manner the piston 58 is engageable with the pins 74 for being rotated with the housing 31. The pins 74 are fitted in suitable holes in the cover 32 and the intermediate member 36. The cover 32 is removably fastened to the cylindrical section 36 by a plurality of bolts 76.

The clutch 56 is operable to drivingly connect the rotatable housing 31 to the impeller 16 in response to the piston 58 moving to clamp the plates 70 and the disk 72 between the piston and the inside wall surface 80 of the end cover 32. Fluid pressure in the chamber 64 causes the piston 58 to be biased into a partial or full engagement condition of the clutch 56. Coil springs 82 are disposed near the outer periphery of the piston 58 and bias the piston toward the clutch disengaged condition. Accordingly, by controlling the fluid pressure acting on the respective opposed faces of the piston or, more particularly, by controlling the difference between the pressure of fluid in the chamber 64 and the chamber 66 the engagement of the clutch may be modulated between a disengaged and fully engaged condition to apportion the power output of the transmission between the power takeoff shafts driven by the gear 42 and the torque converter output shaft 28.

Fluid is introduced into the interior of the housing 31 by way of suitable conduit means connected to a passage 88 in the casing 12. Fluid flows from the passage 88 through the annular space between the shaft 28 and tubular member 20 and through a passage 25 formed between the distal end of the tubular member and the hub of the turbine 16. Fluid fills the toroidal chamber formed by the impeller 16, stator 22 and turbine 26 as well as the entire interior space of the housing 31 defined by the chamber 64. Fluid exits the chamber 64 through the passage 68 and flows over the clutch 56 and out of chamber 66 by way of the annular space between the hub portion 38 and the tubular member 20. A passage 90 in the casing 12 is in communication with the annular space between the hub portion 38 and the tubular member 20 by way of an opening 92 in the flange 93 of the tubular member.

Figure 3:
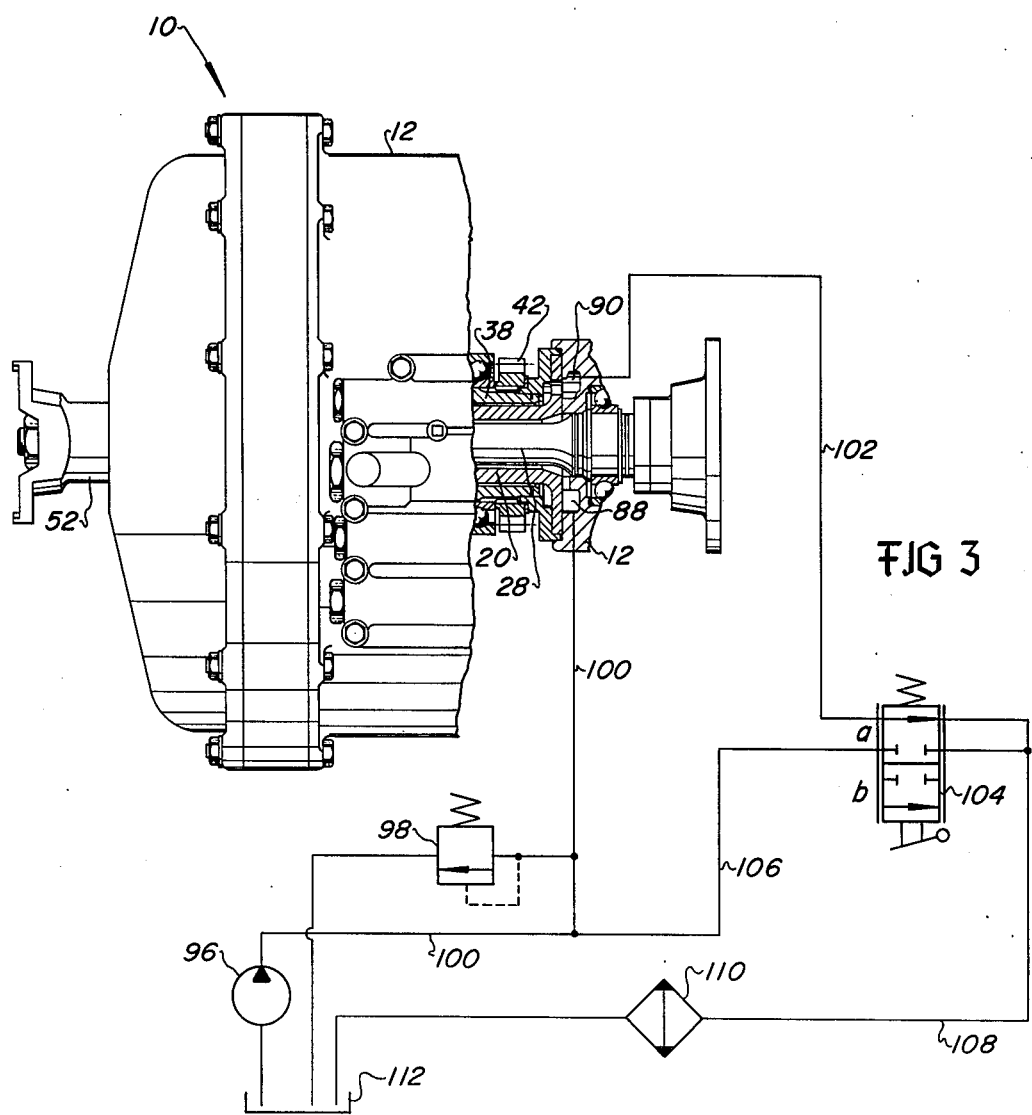
FIG. 3 is a schematic illustration of the fluid control circuit of the transmission mechanism of the present invention.

Referring to FIG. 3 there is illustrated a simplified schematic of a control circuit for controlling the engagement of the input clutch 56. The control circuit shown in FIG. 3 includes a pump 96 and pressure regulator means 98 for supplying liquid at a regulated pressure to the torque converter by way of a conduit 100 in communication with the passage 88. The liquid may be a conventional transmission working fluid which also serves to lubricate and cool the transmission mechanism. A conduit 102, in communication with the passage 90, conducts fluid from the torque converter housing to a control valve 104. The valve 104 is illustrated as a two-position valve infinitely positionable between the two conditions shown. The valve 104 is spring biased to be normally in position $a$ and is shown to be lever actuated to position $b$. The position of the actuators for the valve 104 may be reversed depending on the use of the transmission 10. A bypass conduit 106 is connected to the valve 104 and the conduit 100.

The schematic control circuit of FIG. 3 shows a conduit 108 connected to the valve 104 for conducting fluid from the valve to a heat exchanger 110 and then to a reservoir 112. Fluid flowing in the conduit 108 might also be conducted to lubricate the remainder of the transmission working parts before being returned to the reservoir 112. The control circuit of FIG. 3 including the valve 104 may be adapted to be interposed in a conventional fluid circuit which would further include other transmission control valves for operating speed and directional clutches if such elements were used. The circuit shown in FIG. 3 has such elements eliminated in the interest o conciseness.

In operation of the transmission 10 the engagement of the clutch 56 is modulated by moving the control valve 104 between positions $a$ and $b$ for controlling the difference in fluid pressure in the chambers 64 and 66 and, accordingly, controlling the movement of the piston 58. In position $a$ of the valve 104 fluid flows through chamber 64, through the passage 60 and over the clutch surfaces formed by the plates 70 and 72, the piston 58, and the housing cover 32. Fluid flows through openings 114 in the plates 70 and out of the chamber 66 through the annular space between the hub portion 38 and member 20. Fluid is allowed to flow relatively freely from the chamber 66 of the torque converter housing and, because of the restricted passage 68, a pressure difference in the chambers 64 and 66 causes the piston 58 to clamp the driven plates tightly to thereby drive the impeller 16 at the rotative speed of the housing 31. As the valve 104 is selectively moved toward position $b$ the flow of fluid from chamber 66 is increasingly restricted and accordingly the difference between the fluid pressures in the respective chambers 64 and 66 will decrease thereby causing the piston to reduce its clamping force on the driven plates 70 allowing the plates to rotatively slip with respect to the housing 31, plate 72 and the piston. In accordance with the decrease in the pressure differential between the chambers 64 and 66 the speed of the impeller 16 will decrease and the power output of the torque converter will be reduced providing for more of the power input to the transmission to be taken off through the gear 42.

As the piston 58 is moved by the springs 82 to allow the clutch to slip in accordance with the decrease in the fluid pressure difference in chambers 64 and 66 the flow of fluid from the first chamber 64 through the second chamber 66 is decreased until, at total disengagement of the clutch 56, fluid flow is bypassed around the torque converter through the conduit 106. However, due to the fact that in such an operating condition no power is being transmitted through the clutch 56 or the fluid coupling of the torque converter 14 the cooling requirements of these elements is nil and no fluid flow through the housing 31 is required. The valve 104 might be modified to provide for a very small flow through the housing 31 when the valve is in position $b$ if the transmission 10 were to be used in applications where the clutch 56 was to be operated in a disengaged condition for long periods of time and thereby create some heat from churning of fluid in the housing. By placing the passage 68 near the outer circumference of the piston 58 fluid continually bathes the clutch plates 70 and 72 as it flows through the chamber 66 when the clutch is engaged or partially engaged.

From the foregoing it may be appreciated that the transmission 10 of the present invention includes a driving or input clutch which is adapted in an improved manner to provide for modulating the power input to a hydrokinetic coupling or torque converter. A simplified and reliable fluid control circuit is provided by controlling flow of fluid through the torque converter housing. Moreover the improved arrangement of the clutch 56 minimizes the number of clutch parts and the space required by such parts in the transmission mechanism.

What is claimed is:

1. A transmission mechanism comprising a rotatable housing connected to a driving member;
    a movable piston disposed in said housing and dividing the interior of said housing into first and second fluid chambers;
    a hydrokinetic coupling disposed in said first chamber and including rotatable impeller and turbine members;
    a clutch disposed in said second chamber and including driving and driven members operable to be selectively engaged to drivingly connect said housing to said impeller in response to movement of said piston;
    restricted passage means interconnecting said first and second chambers;
    a fluid circuit including means for causing pressure fluid to flow through said first and second chambers by way of said passage means, first conduit means for conducting fluid to said first chamber, second conduit means for conducting fluid from said second chamber, a control valve for throttling the flow of fluid from said second chamber to cause a selectively variable pressure difference between said chambers for actuating said piston to modulate the engagement of said clutch, and further conduit means interconnecting said first conduit means and said control valve, said control valve being operable to conduct fluid to said second conduit means from said first conduit means without flowing through said first and second chambers when the flow of fluid from said second chamber is substantially throttled.

2. A transmission mechanism comprising a rotatable housing connected to a driving member;
    a movable piston disposed in said housing and dividing the interior of said housing into first and second fluid chambers;
    a hydrokinetic coupling disposed in said first chamber and including rotatable impeller and turbine members;
    a clutch disposed in said second chamber and including driving and driven members operable to be selectively engaged to drivingly connect said housing to said impeller in response to movement of said piston, said driving and driven members including coactable friction surfaces thereon, said housing including a removable cover member having a driving friction surface thereon;
    restricted passage means interconnecting said first and second chambers and a fluid circuit including means for causing pressure fluid to flow through said first and second chambers by way of said passage means, said passage means being disposed to be in communication with said second chamber in such a way that at least a portion of the fluid flowing through said second chamber flows over said friction surfaces; and,
    a control valve for controlling the flow of fluid to cause a selectively variable pressure difference between said chambers for actuating said piston to modulate the engagement of said clutch.

3. The invention set forth in claim 2 wherein:
    said driven member of said clutch comprises at least one friction plate drivingly connected to said impeller, said driving member of said clutch includes a friction surface of said piston drivingly engageable with said plate, and said plate is disposed in said housing between said piston and said cover member.

* * * * *